Sept. 7, 1943.  A. BOOTH  2,328,544
VARIABLE SPEED GEAR
Filed Aug. 6, 1942  2 Sheets-Sheet 2

Inventor.
Alfred Booth.
per. Ferdinand Broster Bosshardt
Attorney.

Patented Sept. 7, 1943

2,328,544

UNITED STATES PATENT OFFICE 2,328,544

VARIABLE SPEED GEAR

Alfred Booth, Pendlebury, England, assignor of one-half to Fred Horace Coles, Epsom, Surrey, England Application August 6, 1942, Serial No. 453,865
In Great Britain August 27, 1941

4 Claims. (Cl. 74—230.17)

This invention relates to that kind of variable speed gear wherein there is an endless driving member adapted to transmit motion from one expanding V-pulley to another, the rate of transmission being infinitely variable within predetermined limits by expansion and contraction of the said pulleys.

The object of my invention is to provide a novel form of the said kind of gear which whilst transmitting motion positively is not costly to produce and is durable and capable of operating efficiently at high speeds.

A variable speed driving gear of the hereinbefore specified kind in accordance with my invention has an endless driving member consisting of a belt or chain provided with serrations, teeth, depressions or the equivalent of fixed form which engage radial slides which are mounted on the expanding V-pulleys and have means adapted to assume the counterpart form of the said serrations, teeth, depressions or the equivalent to produce a positive driving engagement between the slides and the driving member, plain surfaces being provided on the driving member which by cooperation with the conical surfaces of the expanding V-pulleys cause the driving member to be supported by the said surfaces against radial inward displacement of the driving member.

The radial slides are arranged to slide in undercut slots in the opposed conical faces of the expanding V-pulleys whereby displacement of the said faces towards each other acts to slide the slides radially outwards and displacement of the said faces away from each other acts to slide the said slides radially inwards.

The slides are preferably provided with rollers or similar means to reduce friction between them and the expanding V-pulleys.

The means provided on the slides to establish a positive driving connection between the slides and the driving belt or chain may comprise thin plates independently slidable on the slides towards and away from the centres of the expanding V-pulleys, the outer ends of the said plates being adapted to jointly assume the counterpart form of the serrations, teeth, depressions or the equivalent and the plates being controlled by devices which permit movement of the said plates into positions where their outer ends assume the said form when not loaded, but secure them against movement out of the said positions when loaded.

The said devices may comprise small balls, or a slidable or rollable filling piece or pieces acted on by spring means or positive control means, or both.

I attain this object by the mechanism hereinafter described and shown in the accompanying drawings, wherein—

Figures 2 to 4 are drawn to a larger scale than Figure 1.

Figure 1:
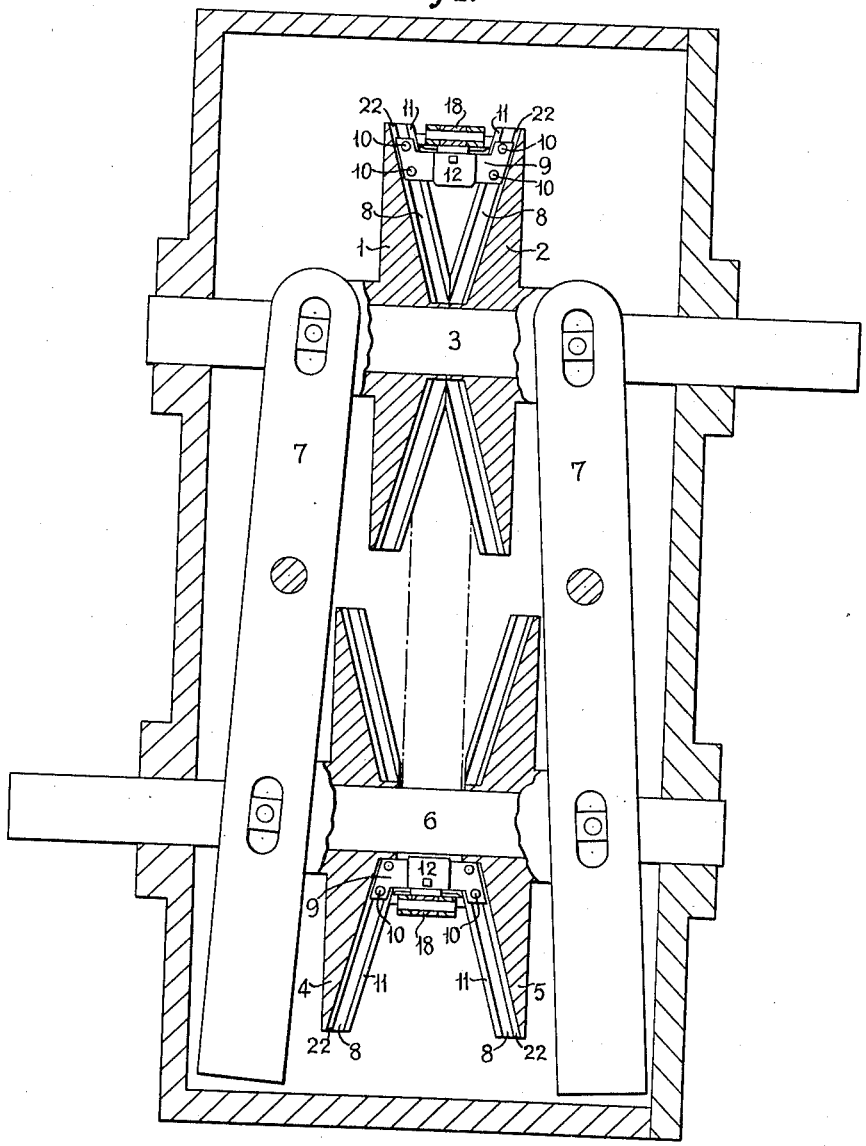
Figure 1 is a side view in section of a variable speed gear.
Figure 2:
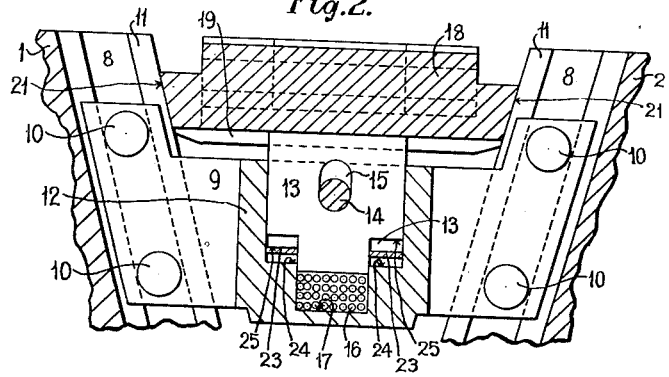
Figure 2 is a fragmentary side view in section illustrating a detail.
Figure 3:
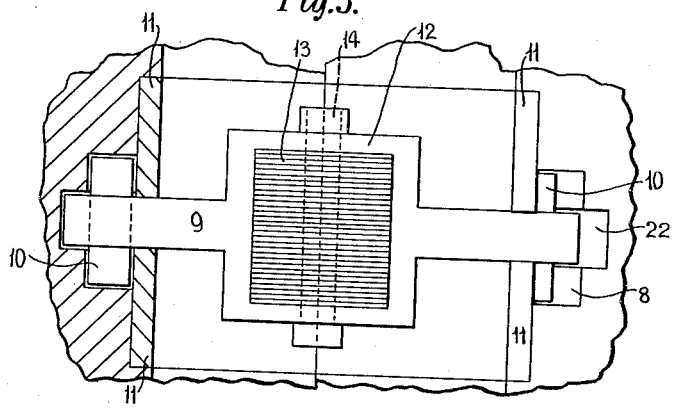
Figure 3 is a fragmentary plan view, partly in section and with the driving chain omitted, and illustrating a detail.

Referring to the drawings, in the construction shown therein, as applied by way of example to a variable speed gear wherein the two parts 1, 2 respectively of an expanding V-pulley are slidably mounted on an input shaft 3 and the two parts 4, 5 respectively of a second expanding V-pulley are slidably mounted on a parallel output shaft 6, and shift levers 7 are provided to move the parts of either pulley towards each other whilst simultaneously moving the parts of the other pulley away from each other, I provide the conical face of each pulley part with radial slots 8 having the same angle of obliquity to the shafts as the conical face provided with them. The slots in the face of each part register with those in the face of the other part of each pulley. There are two or more slots 8 in each pulley part. From inside each slot of the one part to the inside of the opposed slot of the other part there extends a slide 9 having rollers 10 situated in the slots and riding on the bottom surfaces of the slots. Countersunk longitudinal strips 11 are at the sides of the slots to project over the edges thereof and thereby engage the ends of the rollers 10 so as to constrain them to remain in the slots 8. Each slide has a compartment 12 which is open at its outer end and contains a pack of independently movable thin plates 13 with outer ends projecting from the open outer end of the compartment 12. The inward and outward movement of the plates 13 are limited by a pin 14 provided on the slide 9 and engaging elongated slots 15 in all of the plates 13. The plates 13 all have the same dimensions and a plurality of small steel balls 16 are situated in the compartment 12 and are supported by an outwardly directed surface 17 provided at the bottom of the compartment 12.

The plates 13 slide on each other and become relatively displaced to produce jointly an outer configuration conforming more or less to positive driving means provided on an endless chain composed of links 18 pivoted together by the aid of lugs on the outer sides of the links. The positive driving means may consist of a series of teeth 19 and teeth gaps 20 of invariable pitch, or a series of serrations, or a series of cavities say of semi-cylindrical or other arcuate form provided on the inner side of the links.

Figure 4:
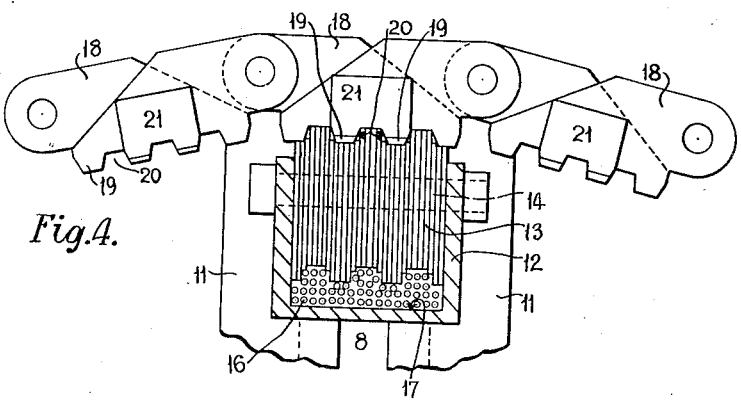
Figure 4 is a fragmentary front view illustrating a detail.

In assuming positions to engage the said driving means, some of the plates 13 are pushed inwards by the driving means and thereby displace the balls 16 which are thereby constrained to push the remaining plates 13 outwards, whereby the last named plates are driven into and held in the gaps 20 between the driving teeth 19 or of the serrations or into the driving recesses and thus establish a positive driving connection between the slide 9 and the driving chain, see more particularly Figure 4.

Each link 18 of the driving chain has two or more lateral bearing faces 21 which conform with the conicity of the opposed pulley faces and ride on the said faces. These bearing faces 21 support the driving chain on the opposed pulley faces and therefore bear the radial components of the chain tension and driving strains, and thereby relieve the slides 9, plates 13 and balls 16 of the said strains. The only substantial force to which the slides 9, plates 13 and balls 16 are therefore submitted is a pressure in the direction in which the driving chain is moving whilst in positive engagement with the plates 13.

The driving chain functions like an inverted tooth chain and makes line contact with the conical faces of the pulley parts 1, 2, 4, 5 for its position. The slides 9 with the plates 13 slide in the slots 8 in the said faces and due to their natural generation of centrifugal forces may act to draw the cone parts towards each other and thereby obviate the need for a chain tensioning device. The plates 13 are constantly urged outwards by centrifugal forces and centrifugal force can be utilized to ensure an adequate lubrication of their surfaces which slide on one another. The plates 13 do not slide relative to the chain links 18 except when becoming engaged with and disengaged from gaps 20 between the teeth 19 of the driving chain whilst not under load. When they have engaged the said gaps and thereby formed a temporary solid connection with the driving chain, the balls 16 assume a solid state by binding on each other under load transmitted through the plates 13 and thereby retain the plates 13 in the positions which they have assumed under the action of the teeth 19 and centrifugal effect. Therefore wear due to movement of the plates 13 is not great.

The slides 9 are locked against outward radial movement by their connection to the two parts 1 and 2 or 4 and 5 of the pulley by which they are carried and consequently the forces to which the driving chain are subjected are limited to the driving tension and the centrifugal force set up by the chain itself. The only substantial force to which the plates 13 are subjected is the driving force. The plates 13 are not subjected to any force in the axial plane of the pulley.

Instead of balls, any other means which are solid but are capable of floating or behaving in a fluid manner during the automatic adjustment of the plates to accommodate their outer ends to the momentary contour presented to them by the positive driving means provided on the driving chain may be provided.

The bottom surfaces of the slots are provided with longitudinal recesses 22 to accommodate the ends of the slide 9.

To enable the gear to be adjusted to a different ratio whilst it is stationary, the rollers are made with a small amount of clearance in the slots, so that the slides 9 are free to recede from the chain link or belt until the projected plates 13 are just clear of the extremities of the teeth 19. The links 18 or belt and therefore the teeth 19 thereby become free to move over the slides during adjustment without fouling and therefore without damaging the plates 13 or other parts on the slide. When the gear is started up before it is loaded the bearing surfaces 21 drive the output pulley and the centrifugal effect thus obtained forces the slides outwards into the position where their plates 13 can engage between the teeth 19.

To keep the plates 13 projected when not being acted on by the teeth 19, bow springs 23 may be provided with their ends supported by surfaces 24 in the compartment 12 to act on shoulders 25 provided on the plates 13.

I claim:

1. A variable speed gear comprising expanding V-pulleys, an endless driving member for transmitting motion from one of the said pulleys to another, means for expanding and contracting the said pulleys, positive driving means of fixed form on the said driving member, radial slides provided on the said pulleys, positive driving means of variable form provided on the slides for assuming the counterpart form of and engaging with the first named positive driving means, plain surfaces on the said driving member seating on the conical surfaces of the said pulleys for supporting the said driving member against inward radial displacement of the said member.

2. A variable speed driving gear comprising a pair of expanding V-pulleys, means for expanding and contracting the said pulleys, an endless driving member mounted on the pair of pulleys for transmitting motion from one pulley to the other, undercut radial slots provided in the conical faces of the said pulleys, slides sliding in the said slots, rollers provided on the slides for engagement with the undercut portions of the said slides, positive means on the driving member and on the slides for establishing a positive driving connection between the said driving member and the slides, and means on the driving member for riding on the conical surfaces of the said pulleys.

3. A variable speed gear comprising a pair of expanding V-pulleys, means for expanding and contracting them, an endless driving member running on the said pulleys, positive driving elements of fixed form on the endless driving member, radially slidable slides on the said pulleys, a plurality of thin plates independently slidable on the said slides for displacement by and engagement with the positive driving elements on the driving member, solid fluid means on the slide for causing sliding displacement of some of the said plates to produce a sliding displacement of others of the said plates in the reverse direction and thereby causing the ends of the plates under the action of the driving member to assume jointly substantially the counterpart form of the positive driving means on the said driving member and thereby positively engage the said positive driving means and also to cause the plates to maintain their displaced positions whilst under driving load, and means on the said driving member for supporting the driving member on the conical surfaces of the said pulleys and thereby preventing the driving member from approaching the slides radially beyond a predetermined distance.

4. A variable speed gear comprising a pair of expanding V-pulleys, means for expanding and contracting them, an endless driving member running on the said pulleys, driving teeth on the endless driving member, radially slidable slides on the said pulleys, a plurality of thin plates independently slidable on the said slides for displacement by and engagement with the positive driving elements on the driving member, small balls in the slide for causing sliding displacement of some of the said plates to produce a sliding displacement of others of the said plates in the reverse direction and thereby causing the ends of the plates under the action of the driving member to assume jointly substantially the counterpart form of the driving teeth and intervening tooth gaps on the said driving member and thereby positively engage the said driving teeth and intervening tooth gaps and also to cause the plates to maintain their displaced positions whilst under driving load, and supporting surfaces on the said driving member for supporting the driving member on the conical surfaces of the said pulleys and thereby preventing the driving member from approaching the slides radially beyond a predetermined distance.

ALFRED BOOTH.